US009093032B2

(12) United States Patent
Hussain et al.

(10) Patent No.: US 9,093,032 B2
(45) Date of Patent: Jul. 28, 2015

(54) SYSTEM, METHODS, AND DEVICES, FOR INAUDIBLE ENHANCED PWM DIMMING

(75) Inventors: Asif Hussain, San Jose, CA (US); Manisha P. Pandya, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 871 days.

(21) Appl. No.: 13/251,123

(22) Filed: Sep. 30, 2011

(65) Prior Publication Data

US 2013/0082618 A1 Apr. 4, 2013

(51) Int. Cl.
H05B 41/28 (2006.01)
G09G 3/34 (2006.01)

(52) U.S. Cl.
CPC ........ G09G 3/3406 (2013.01); *G09G 2320/064* (2013.01); *G09G 2330/02* (2013.01)

(58) Field of Classification Search
USPC ...... 315/247, 224, 225, 209 R, 291, 307–326
See application file for complete search history.

(56) References Cited

U.S. PATENT DOCUMENTS

| 6,825,644 B2 | 11/2004 | Kernahan |
| 2009/0026977 A1 | 1/2009 | Omi |
| 2009/0128883 A1 | 5/2009 | Endo et al. |
| 2009/0213062 A1 | 8/2009 | Ng et al. |
| 2010/0046124 A1 | 2/2010 | Hibi |
| 2011/0080117 A1 | 4/2011 | Peker et al. |

FOREIGN PATENT DOCUMENTS

| EP | 0982707 A1 | 3/2000 |
| WO | 2008081223 A1 | 7/2008 |

OTHER PUBLICATIONS

Microsemi Brochure, Multi-Strong LED Back-Light Controller-LX1996, Dec. 14, 2007, 22 pgs.
Texas Instruments Brochure, "TPS61195 WLED Driver for LCD Backlighting with PWM and SMBUS Control Interface," May 2010—Revised Aug. 2010, 31 pgs.
Huang, et al.; "Dithering Skip Modulation, Width and Dead Time Controllers in Highly Efficient DC-DC Converters for System-On-Chip Applications;" IEEE Journal of Solid-State Circuits, vol. 42, No. 11, Nov. 2007, pp. 2451-2465.
International Search Report and Written Opinion for PCT No. PCT/US2012/056010 dated Dec. 13, 2012; 13 pages.

*Primary Examiner* — Tuyet Vo
(74) *Attorney, Agent, or Firm* — Fletcher Yoder PC

(57) ABSTRACT

Systems and methods for inaudible enhanced pulse width modulation (PWM) backlight dimming are provided. By way of example, an electronic display backlight system according to the present disclosure may include a backlight element and backlight driver circuitry. The backlight driver circuitry may drive the backlight element at various brightness levels using at least two individual duty cycles that occur immediately after one another. The backlight driver circuitry may vary the individual duty cycles such that none will ever reach 100% unless all are 100%, thereby preventing the occurrence of audible noise that might otherwise arise if an "on" PWM period from one individual duty cycle continued into the next.

9 Claims, 7 Drawing Sheets

US 9,093,032 B2

SYSTEM, METHODS, AND DEVICES, FOR INAUDIBLE ENHANCED PWM DIMMING

BACKGROUND

The present disclosure relates generally to pulse width modulation (PWM) backlight dimming and, more particularly, to inaudible enhanced PWM backlight dimming.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays, such as liquid crystal displays (LCDs), appear in many different electronic devices. The brightness of an LCD depends on the amount of light provided by a backlight assembly. As the backlight assembly emits more light, the brightness of the LCD increases. The backlight assembly may vary the average amount of light emitted by varying a pulse width modulation (PWM) duty cycle of a backlight element, such as a string of light emitting diodes (LEDs). Over time, varying the proportion of the time the backlight is on relative to the time the backlight is off causes the average amount of emitted light to vary accordingly. When the backlight element is switched on and off faster than about 200 Hz, a user will only perceive a change in the intensity of the backlight and is unlikely to see flickering.

Transitioning from one level of backlight assembly brightness to another is ideally carried out in as smooth a manner as possible. The higher the dimming resolution of the backlight—that is, the higher the total number of discrete dimming steps available to the backlight assembly—the smoother the transition from one step to another may be. One manner of increasing the dimming resolution may involve using a faster PWM division signal, which may be used to "chop" a PWM duty cycle into finer segments or pulse widths of a PWM clock cycle. With a faster PWM division signal, a greater number of potential PWM duty cycles may be available at the same PWM clock cycle frequency. A faster PWM division frequency, however, may require new clock circuitry and/or may consume more power. Another manner of increasing the dimming resolution may involve lowering the frequency of the PWM clock cycle while the frequency of the PWM division signal remains the same. With a slower PWM clock cycle, a greater number of potential PWM duty cycles may be available at the same PWM division signal frequency. Achieving meaningful increases in dimming resolution in this way, however, may involve lowering the PWM clock cycle frequency to a frequency less than 20 kHz. At such relatively low frequencies, some longer PWM duty cycles may produce an undesirable "singing capacitor" effect that could be audible to some users.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods for inaudible enhanced pulse width modulation (PWM) backlight dimming. Such inaudible enhanced PWM backlight dimming may achieve resolutions higher than possible using only a single individual PWM duty cycle, while remaining inaudible. By way of example, an electronic display backlight system according to the present disclosure may include a backlight element and backlight driver circuitry. The backlight driver circuitry may drive the backlight element at various brightness levels using at least two individual duty cycles that occur immediately after one another. The backlight driver circuitry may vary the individual duty cycles such that none will ever reach 100% unless all are 100%, thereby preventing the occurrence of audible noise that might otherwise arise if an "on" PWM period from one individual duty cycle continued into the next.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
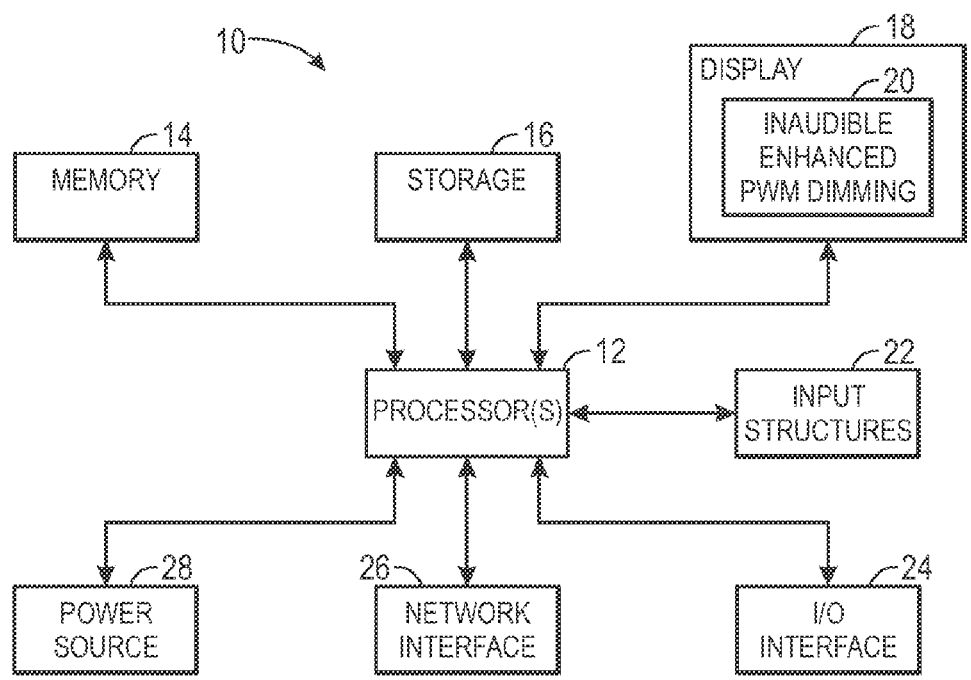
FIG. 1 is a schematic block diagram of an electronic device that incorporates a display with inaudible enhanced pulse width modulation (PWM) backlight dimming, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to relatively high-resolution backlight dimming that can operate with relatively low-frequency clock signals, but which does not produce distracting audible sounds. As mentioned above, electronic displays such as liquid crystal displays (LCDs) are often illuminated by a backlight assembly. The brightness of an LCD will depend on the amount of light provided by the backlight assembly. According to the present disclosure, a backlight assembly may vary the amount of light provided to the backlight by adjusting pulse width modulation (PWM) duty cycles of the backlight assembly. Over time, rapidly activating and deactivating the backlight at varying proportions of time the backlight is on relative to time the backlight is off causes the average amount of light to vary accordingly.

The present disclosure will describe a manner of "enhanced" PWM dimming. As used herein, "enhanced PWM dimming" refers to PWM dimming using multiple duty cycles extending across multiple PWM clock cycles—thereby allowing an "extended" duty cycle that encompasses several successive individual duty cycles. Every additional individual duty cycle used in an extended duty cycle may add potential dimming resolution. For example, the extended duty cycle may include two back-to-back individual duty cycles that follow one after the other. At the lowest brightness level that causes the backlight to still emit light, only one duty cycle division of the first individual duty cycle duty cycles may be on. At the highest brightness level, the entire first and second individual duty cycles may be on. Since doubling the number of individual duty cycles that compose an extended duty cycle generally doubles the number of possible duty cycle divisions or PWM pulse widths, doubling the number of individual duty cycles of the extended duty cycle may add one about 1 bit of additional dimming resolution. Thus, additional dimming resolution may be added without increasing the PWM division signal frequency or reducing the PWM clock frequency.

In general, as long as the "on" periods of the extended PWM duty cycle remain faster than about 200 Hz, a user will only perceive a change in the intensity of the backlight and is unlikely to see flickering. Yet "on" periods associated with frequencies of less than 20 kHz (i.e., periods of 50 μs or longer) may produce undesirable audible noise to some users. As such, to keep enhanced PWM dimming operations inaudible, the backlight assembly may insert "skip pulses," or brief backlight-off periods (e.g., of one PWM division or pulse width) between the individual the individual duty cycles of an extended duty cycle. Thus, the operating frequency of the extended PWM duty cycle will remain at or less than that of any single one of its constituent individual duty cycles. As long as the PWM clock cycle remains higher than 20 kHz, no backlight-on period of the extended PWM duty cycle will be longer than 50 μs, thereby remaining inaudible.

Figure 2:
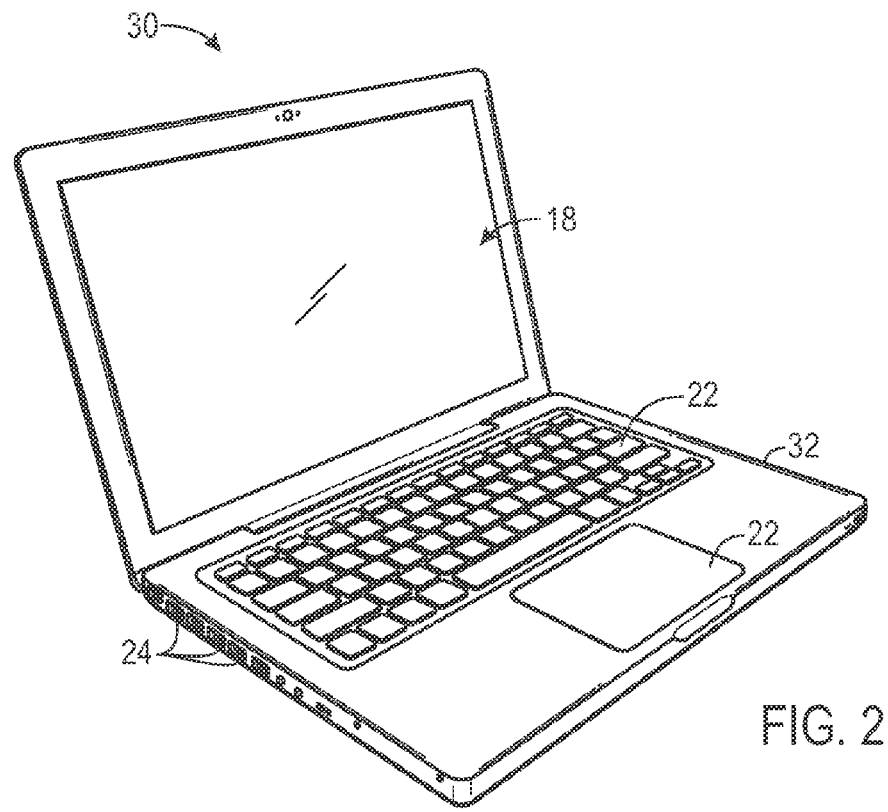
FIG. 2 is a perspective view of an example of the electronic device of FIG. 1 in the form of a notebook computer, in accordance with an embodiment.
Figure 3:
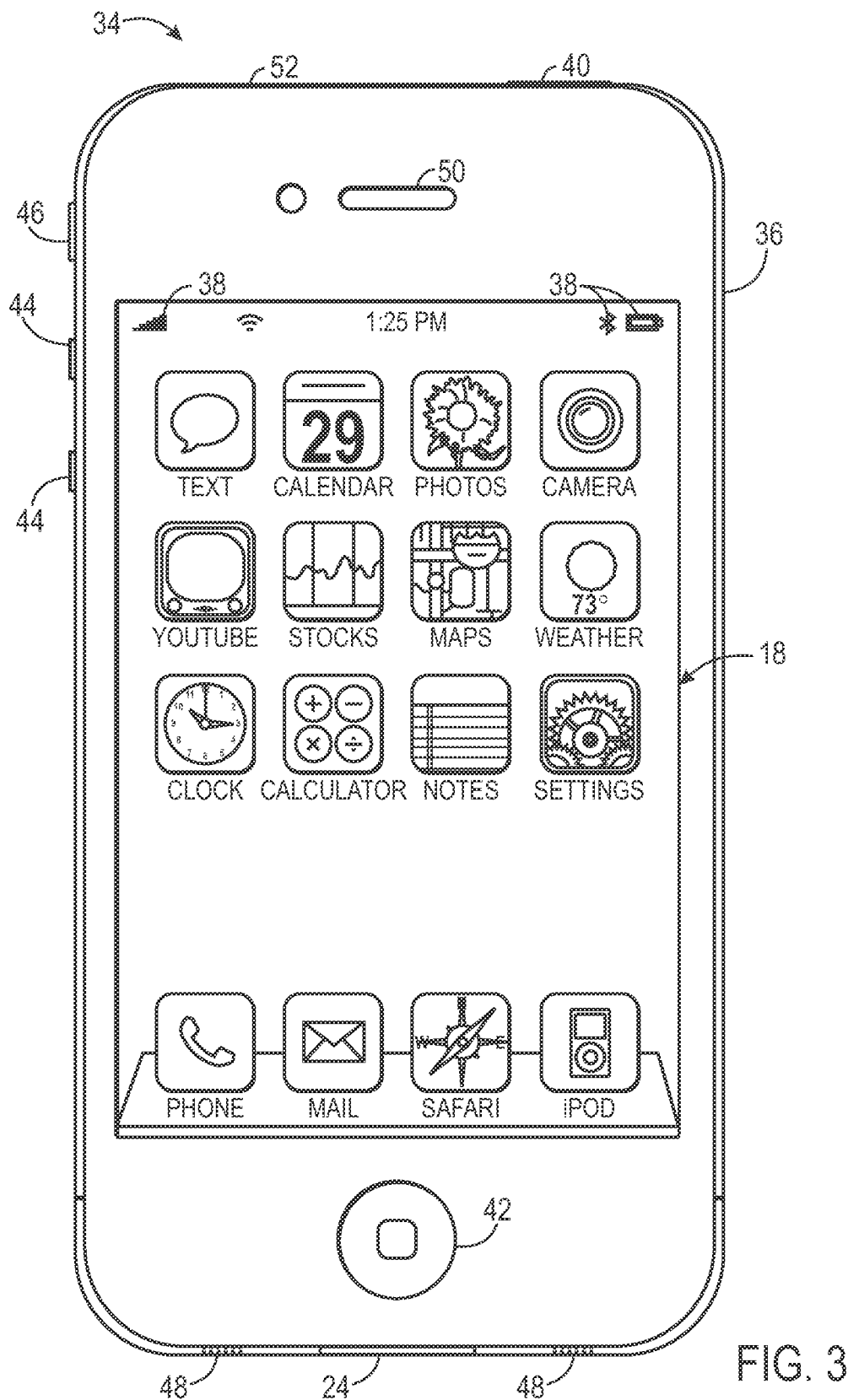
FIG. 3 is a front view of an example of the electronic device of FIG. 1 in the form of a handheld electronic device, in accordance with an embodiment.
Figure 4:
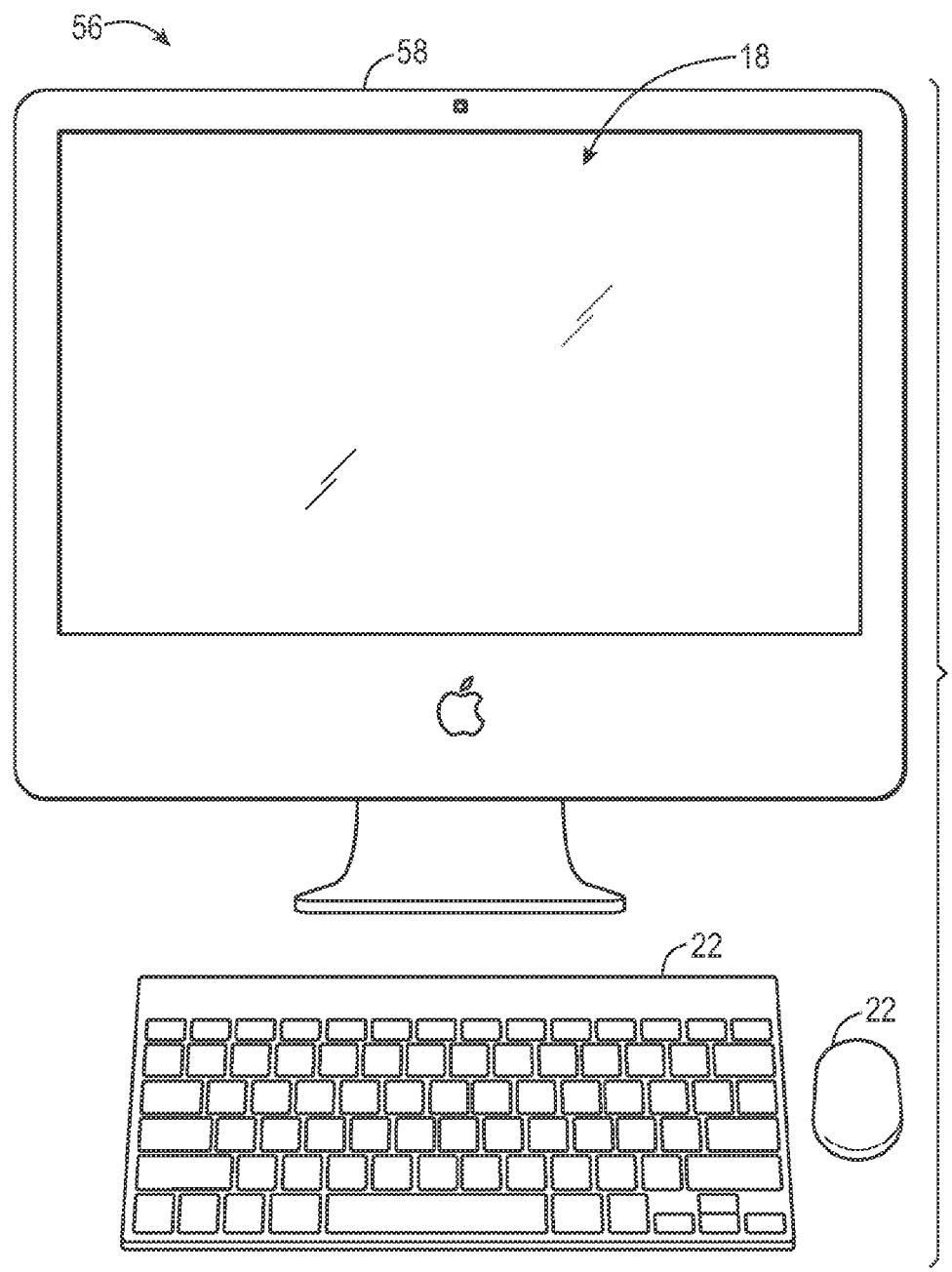
FIG. 4 is a front view of an example of the electronic device of FIG. 1 in the form of a desktop computer, in accordance with an embodiment.

With the foregoing in mind, a general description of suitable electronic devices that may employ electronic displays with inaudible enhanced PWM dimming capabilities will be provided below. In particular, FIG. 1 is a block diagram depicting various components that may be present in an electronic device suitable for use with such a display. FIGS. 2, 3, and 4 illustrate various examples of suitable electronic devices in the form of a notebook computer, a handheld electronic device, and a desktop computer, respectively.

Turning first to FIG. 1, an electronic device 10 according to an embodiment of the present disclosure may include, among other things, one or more processor(s) 12, memory 14, nonvolatile storage 16, a display 18 having inaudible enhanced PWM dimming 20, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

By way of example, the electronic device 10 may represent a block diagram of the notebook computer depicted in FIG. 2, the handheld device depicted in FIG. 3, the desktop computer depicted in FIG. 4, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to execute instructions to carry out various functions of the electronic device 10. Among other things, these functions may include generating image data to be displayed on the display 18. The programs or instructions executed by the processor(s) 12 may be stored in any suitable article of manufacture that includes one or more tangible, computer-readable media at least collectively storing the instructions or routines, such as the memory 14 and/or the nonvolatile storage 16. The memory 14 and the nonvolatile storage 16 may represent, for example, random-access memory, read-only memory, rewritable flash memory, hard drives, and optical discs. Also, programs (e.g., an operating system) encoded on such a computer program product may also include instructions that may be executed by the processor(s) 12 to enable other functions of the electronic device 10.

The display 18 may be a touch-screen liquid crystal display (LCD), for example, which may enable users to interact with a user interface of the electronic device 10. By way of example, the display 18 may be a MultiTouch™ display that can detect multiple touches at once. The display 18 may include inaudible enhanced PWM dimming 20 to achieve additional brightness level resolution without requiring a significantly faster system clock frequency and without producing audible noise.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. The input structures 22, such as a keyboard and/or touchpad, may be used to interact with the computer 30. Via the input structures 22, a user may start, control, or operate a GUI or applications running on computer 30.

The display 18 of the computer 30 may be a backlit liquid crystal display (LCD). The display 18 may include a relatively high-dimming-resolution backlight assembly that includes inaudible enhanced PWM dimming 20. Since the display 18 includes the inaudible enhanced PWM dimming 20, the display 18 may not produce audible noise. Indeed, the display 18 may not produce audible noise even though additional dimming resolution may be obtained by using an extended duty cycle that includes multiple individual duty cycles that together occur at a frequency less than 20 kHz.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate user interface 20 to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones.

Like the display 18 of the computer 30, the display 18 may include a relatively high-dimming-resolution backlight assembly that includes inaudible enhanced PWM dimming 20. Since the display 18 includes the inaudible enhanced PWM dimming 20, the display 18 may not produce audible noise. Indeed, the display 18 may not produce audible noise even though additional dimming resolution may be obtained by using an extended duty cycle that includes multiple individual duty cycles that together occur at a frequency less than 20 kHz.

The electronic device 10 also may take the form of a desktop computer 56, as generally illustrated in FIG. 4. In certain embodiments, the electronic device 10 in the form of the desktop computer 56 may be a model of an iMac®, Mac® mini, or Mac Pro® available from Apple Inc. The desktop computer 56 may include a housing 58, a display 18, and input structures 22, among other things. The input structures 22, such as a wireless keyboard and/or mouse, may be used to interact with the desktop computer 56. Via the input structures 22, a user may start, control, or operate a GUI or applications running on the desktop computer 56.

The display 18 may be a backlit liquid crystal display (LCD). The display 18 may include a relatively high-dimming-resolution backlight assembly that includes inaudible enhanced PWM dimming 20. Since the display 18 includes the inaudible enhanced PWM dimming 20, the display 18 may not produce audible noise. Indeed, the display 18 may not produce audible noise even though additional dimming resolution may be obtained by using an extended duty cycle that includes multiple individual duty cycles that together occur at a frequency less than 20 kHz.

Regardless of whether the electronic device 10 takes the form of the computer 30 of FIG. 2, the handheld device 34 of FIG. 3, the desktop computer 56 of FIG. 4, or some other form, the display 18 of the electronic device 10 may form an array or matrix of picture elements (pixels). By varying an electric field associated with each pixel, the display 18 may control the orientation of liquid crystal disposed at each pixel. The orientation of the liquid crystal of each pixel may permit more or less light emitted from a backlight to pass through each pixel. The display 18 may employ any suitable technique to manipulate these electrical fields and/or the liquid crystals. For example, the display 18 may employ transverse electric field modes in which the liquid crystals are oriented by applying an in-plane electrical field to a layer of the liquid crystals. Examples of such techniques include in-plane switching (IPS) and/or fringe field switching (FFS) techniques.

By controlling of the orientation of the liquid crystals, the amount of light emitted by the pixels may change. Changing the amount of light emitted by the pixels will change the colors perceived by a user of the display 18. Specifically, a group of pixels may include a red pixel, a green pixel, and a blue pixel, each having a color filter of that color. By varying the orientation of the liquid crystals of different colored pixels, a variety of different colors may be perceived by a user viewing the display. It may be noted that the individual colored pixels of a group of pixels may also be referred to as unit pixels.

Figure 5:
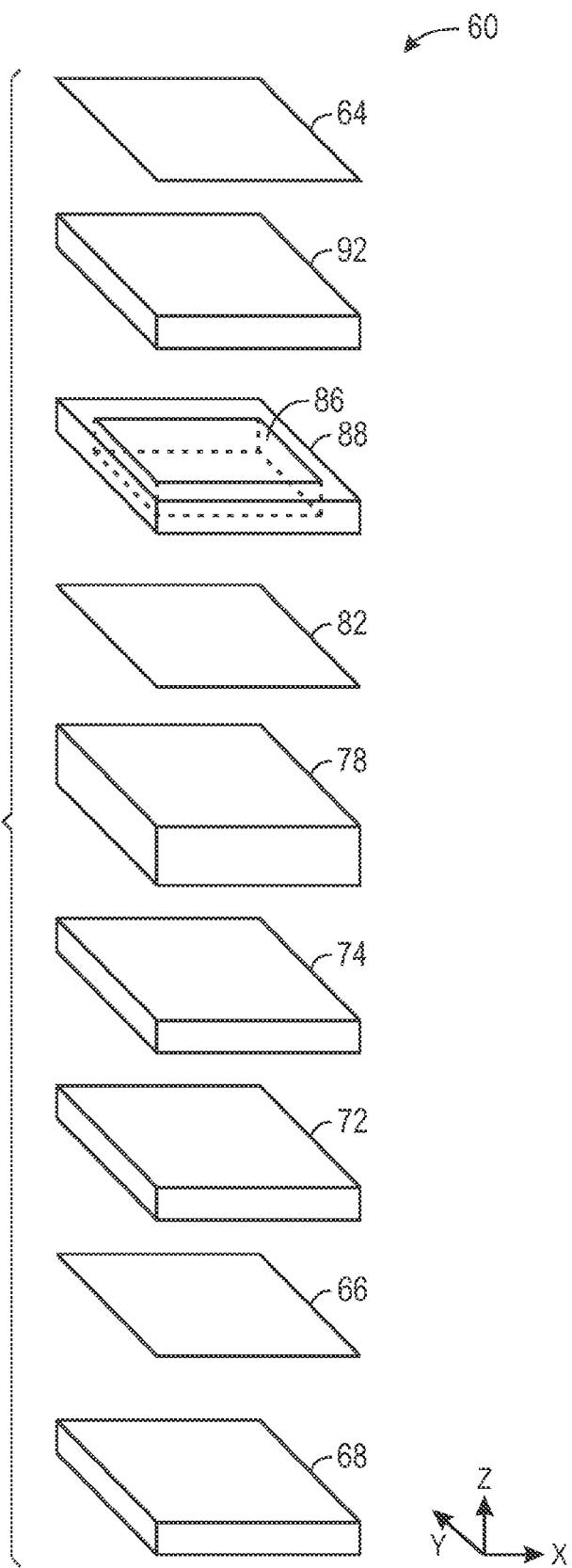
FIG. 5 is a schematic exploded view of various layers of the electronic display of the electronic device of FIG. 1, in accordance with an embodiment.

With the foregoing in mind, FIG. 5 depicts an exploded view of different layers of a pixel of the display 18. The pixel 60 includes an upper polarizing layer 64 and a lower polarizing layer 66 that polarize light emitted by a backlight assembly 68. Although not visible in FIG. 5, the backlight assembly 68 includes the inaudible enhanced PWM dimming 20 discussed throughout this disclosure. A lower substrate 72 is disposed above the polarizing layer 66 and is generally formed from a light-transparent material, such as glass, quartz, and/or plastic.

A thin film transistor (TFT) layer 74 appears above the lower substrate 72. For simplicity, the TFT layer 74 is depicted as a generalized structure in FIG. 5. In practice, the TFT layer may itself include various conductive, non-conductive, and semiconductive layers and structures that generally form the electrical devices and pathways that drive the operation of the pixel 60. The TFT layer 74 may also include an alignment layer (formed from polyimide or other suitable materials) at the interface with a liquid crystal layer 78.

The liquid crystal layer 78 includes liquid crystal particles or molecules suspended in a fluid or gel matrix. The liquid crystal particles may be oriented or aligned with respect to an electrical field generated by the TFT layer 74. The orientation of the liquid crystal particles in the liquid crystal layer 78 determines the amount of light transmission through the pixel 60. Thus, by modulation of the electrical field applied to the liquid crystal layer 78, the amount of light transmitted though the pixel 60 may be correspondingly modulated.

Disposed on the other side of the liquid crystal layer 78 from the TFT layer 74 may be one or more alignment and/or overcoating layers 82 interfacing between the liquid crystal layer 78 and an overlying color filter 86. The color filter 86 may be a red, green, or blue filter, for example. Thus, each pixel 60 corresponds to a primary color when light is transmitted from the backlight assembly 68 through the liquid crystal layer 78 and the color filter 86.

The color filter 86 may be surrounded by a light-opaque mask or matrix, represented here as a black mask 88. The black mask 88 circumscribes the light-transmissive portion of the pixel 60, delineating the pixel edges. The black mask 88 may be sized and shaped to define a light-transmissive aperture over the liquid crystal layer 78 and around the color filter 86. In addition, the black mask 88 may cover or mask portions of the pixel 60 that do not transmit light, such as the scanning line and data line driving circuitry, the TFT, and the periphery of the pixel 60. In the example of FIG. 5, an upper substrate 92 may be disposed between the black mask 88 and color filter 86 and the polarizing layer 64. The upper substrate 92 may be formed from light-transmissive glass, quartz, and/or plastic.

Figure 6:
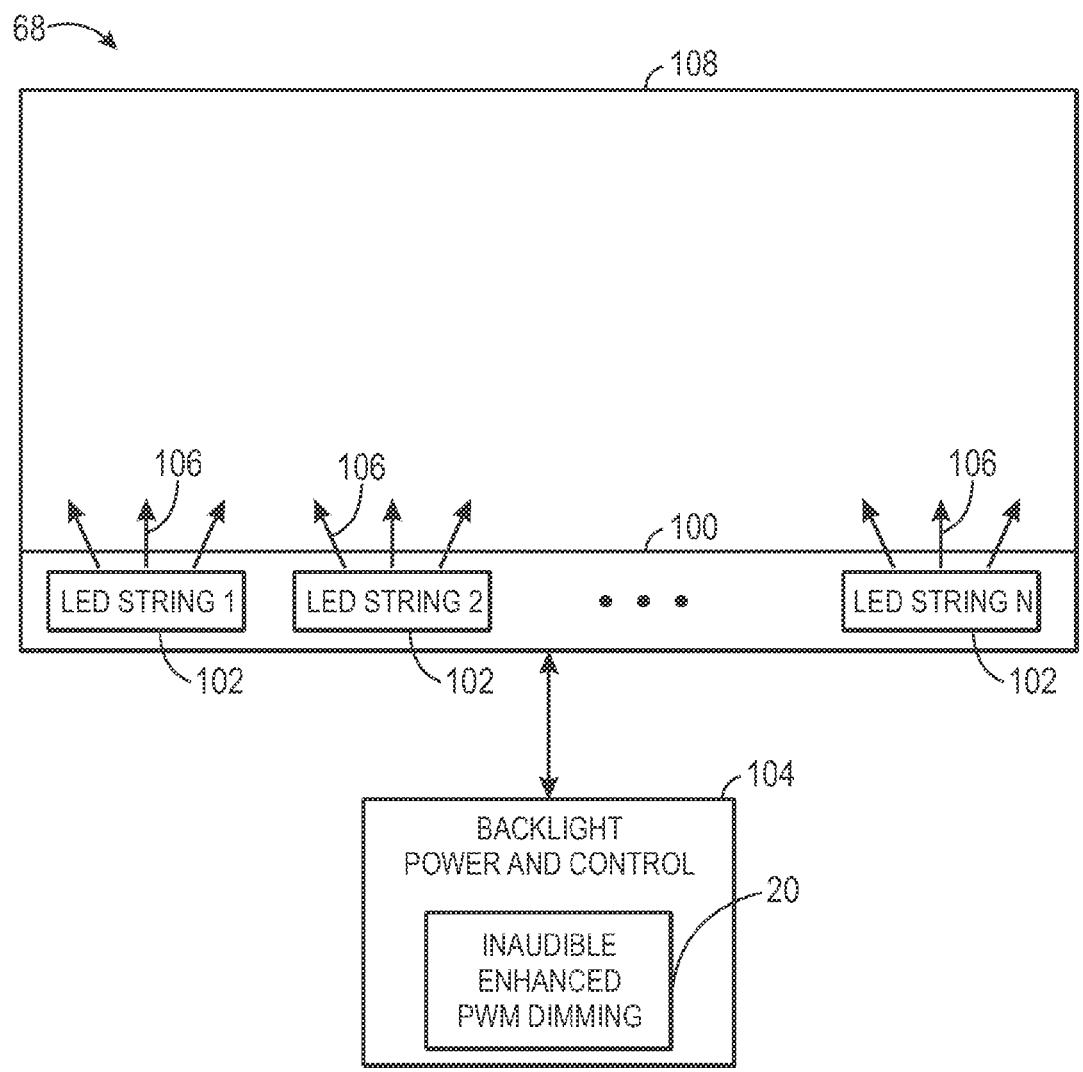
FIG. 6 is a schematic block diagram of a backlight assembly with inaudible enhanced PWM dimming circuitry, in accordance with an embodiment.

The backlight assembly 68 provides light to illuminate the display 18. As seen in FIG. 6, the backlight assembly 68 may include, among other things, one or more backlight elements 100 such as light emitting diode (LED) strings 102. Although the backlight elements 100 in FIG. 6 are shown to be LED strings 102, additionally or alternatively, any other suitable light-emitting backlight elements 100 may be employed. For example, one or more cold cathode lighting elements may be used in lieu of, or in addition to, the LED strings 102. Moreover, although the LED strings 102 of the backlight assembly 68 schematically appear to be disposed in discrete locations apart from one another, the LED strings 102 may be interleaved among one another.

Backlight driver circuitry, here illustrated as backlight power and control circuitry 104, may drive the LED strings 102 to emit light 106. In the example of FIG. 6, the backlight assembly 68 is shown to be edge-lit. That is, the backlight elements 100 may be located at the edge of a diffuser 108, rather than directly underneath. The light 106 may enter the light diffuser 108, which may cause the light 106 to be diffused substantially evenly. Additionally, the light diffuser 108 may cause the light to pass up through the other layers of the display 18, which have been generally discussed above with reference to FIG. 5. While the backlight assembly 68 of FIG. 6 is represented as an edge-lit backlight assembly 68, other arrangements are possible. Indeed, the backlight elements 100 may be disposed in any suitable arrangement, including being disposed beneath or behind the backlight diffuser 108.

The backlight power and control circuitry 104 may control the brightness of the display 18 by varying the amount of light 106 emitted by the LED strings 102. For example, the backlight power and control circuitry 104 may employ any suitable form of pulse width modulation (PWM) to drive the LED strings 102. By varying the duty cycle over which the LED strings 102 are driven over PWM clock cycles, the light perceived by a user of the display may be increased or decreased. Indeed, the backlight power and control circuitry 104 may use the inaudible enhanced PWM dimming 20 to control the brightness of the display 18. The inaudible enhanced PWM dimming 20 may provide additional dimming resolution, or additional brightness levels, by using an extended duty cycle that includes several individual duty cycles that may be individually varied. As will be discussed further below, the inaudible enhanced PWM dimming 20 may insert "skip pulses" to ensure the operation of the extended duty cycle does not become audible.

Figure 7:
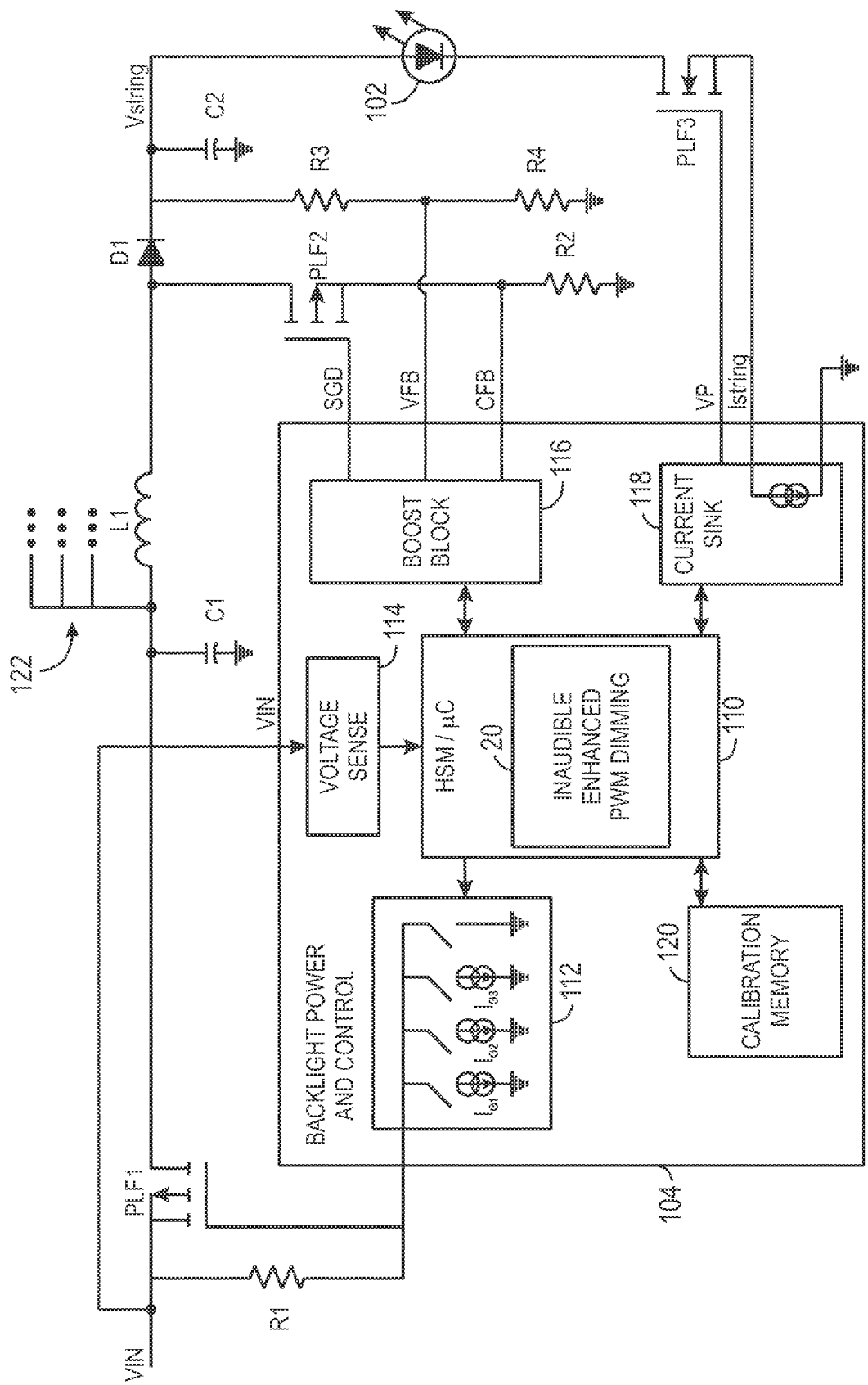
FIG. 7 is a circuit diagram representing a portion of the backlight assembly of FIG. 6, in accordance with an embodiment.

A circuit diagram of FIG. 7 illustrates a relationship between the backlight power and control circuitry 104 and circuitry used to control the backlight elements 100 (e.g., the LED strings 102). A hardware state machine (HSM) and/or microcontroller (µC) 110 may generally govern the operation of the backlight power and control circuitry 104. The HSM and/or µC 110 may also include the ability to perform inaudible enhanced PWM dimming 20, the general operation of which will be discussed further below. To enable the HSM and/or µC 110 to control the manner in which the backlight elements 100 are driven with power, the backlight power and control circuitry 104 may include current sinks 112, voltage sense circuitry 114, a boost block 116, current sink 118, and calibration memory 120. The backlight power and control circuitry 104 may receive an indication of backlight brightness level from a host (e.g., the processor(s) 12), upon which the inaudible enhanced PWM dimming 20 may be based.

These components may enable the backlight power and control circuitry 104 to control three distinct phases of backlight assembly 68 operation: an inrush phase, in which input power initially enters the power supply circuitry of the backlight assembly 68 at an input voltage VIN; a boost soft start phase, in which the boost block 116 boosts the voltage to a level sufficient to drive the backlight elements 100 (e.g., the LED string 102); and a normal operation phase, in which the current sink 118 drives the backlight elements 100 (e.g., the LED strings 102) by drawing current through them according to some pattern (e.g., a pulse width modulation (PWM) duty cycle). Specifically, the inaudible enhanced PWM dimming 20 of the backlight power and control circuitry 104 may cause the current sink 118 to drive the backlight elements 100 (e.g., the LED strings 102) according to an enhanced PWM dimming scheme. One example of such a dimming scheme will be described further below with reference to FIG. 8.

With continued reference to FIG. 7, the inrush phase may begin when the HSM and/or µC 110 cause the current sinks 112 to activate a power line field effect transistor (FET) PLF1. The current sinks 112 may be used by the HSM and/or µC 110 to control the slew rate of the power line FET PLF1 and, by extension, to control the length of time of the inrush phase. Specifically, by applying a gate current $I_{G1}$, $I_{G2}$, and/or $I_{G3}$ from the current sinks 112 to the gate of the power line FET PLF1, the HSM and/or µC 110 may control the slew rate of the power line FET PLF1. It should be understood that the resistor R1 shown in FIG. 7 may optionally be present, but may not be present in other embodiments. When the power line FET PLF1 is activated, an input voltage VIN from an external power supply may be supplied to the backlight assembly 68. As a result, an inrush current may enter the circuitry beyond power line FET PLF1 into a capacitance C1 and through an inductance L1 toward a LED string 102. The amount of time required to complete this inrush phase, also referred to herein as the inrush period Tinrush, may depend upon the slew rate of the power line FET PLF1. In general, the HSM and/or µC 110 may select which of the current sinks 112 to apply based on a programmed value of Tinrush stored in the calibration memory 120. For example, a value set in the calibration memory 120 may set the inrush period Tinrush to one of a variety of suitable values (e.g., 5 ms, 50 ms, 100 ms, or 500 ms, or the like). Depending on the programmed value of Tinrush, the HSM and/or µC 110 may select different of the current sinks 112, varying the slew rate of the power line FET PLF1 and, accordingly, the inrush current. The HSM and/or µC 110 may also deactivate the power line FET PLF1 by grounding the gate of the power line FET PLF1, a condition selectable from among the current sinks 112.

During the inrush phase, power may flow to the inputs of all the LED strings 102 of the backlight assembly 68. It should be noted, however, that FIG. 7 illustrates circuitry to drive only one of the LED strings 102. For clarity, like circuitry may be used to drive the other LED strings 102, the start of which is generally represented at numeral 122. In particular, the circuitry associated with the boost block 116 and the current sink 118 shown in FIG. 7 may operate exclusively with a single one of the LED strings 102. That is, the inductance L1, a diode D1, a power line FET PLF2, resistors R2, R3, and R4, the power line FET PLF3, and certain functionalities of the boost block 116 and current sink 118 shown in FIG. 7 may be associated exclusively with driving a single one of the LED strings 102. For clarity, only one LED string 102 and its associated driving circuitry are shown in FIG. 7. It should be understood, however, that an actual implementation may employ additional like circuitry from numeral 122 to drive each of the other LED strings 102 of the backlight assembly 68.

The boost soft start phase may begin after the inrush phase. During the boost soft start phase, the boost block 116 may boost the voltage from the input voltage VIN to a voltage high enough to drive the LED string 102. Specifically, the boost block 116 may vary a switching signal SGD supplied to the power line FET PLF2. The current may flow through the inductance L1, the power line FET PLF2, and the resistor R2 at a higher rate than otherwise. Because of the inductance L1, this higher rate of current will continue to flow even when the power line FET PLF2 is switched off, flowing through the diode D1 and the resistors R3 and R4 at this higher rate and increasing the LED string 102 input voltage Vstring accordingly. The boost block 116 may determine the frequency of the switching signal SGD by sensing the feedback voltage VFB that occurs between the resistors R3 and R4. Since the feedback voltage VFB correlates with the LED string 102 input voltage Vstring, and the switching signal SGD frequency impacts the degree to which the voltage is boosted, the boost block 116 may vary the switching signal SGD frequency based on the feedback voltage VFB to achieve a desired LED string 102 input voltage Vstring.

Following the boost soft start phase, the LED string 102 input voltage Vstring may be sufficiently high to drive the LED string 102 during a normal operation phase. As such, the backlight assembly 68 may enter a phase of normal operation, during which the LED string 102 may be driven according to varying patterns (e.g., pulse width modulation (PWM) duty cycles) to achieve corresponding brightness levels. To cause the LED string 102 to emit light, the current sink 118 may activate a power line FET PLF3 using a power voltage VP signal and draw a string current Istring through to ground. While the current sink 118 has activated the power line FET PLF3 and is drawing the string current Istring through the LED string 102, the LED string 102 will emit light, illuminating the electronic display 18. By varying the ratio of time the LED string 102 is on and emitting light to the time the LED string 102 is off and is not emitting light (i.e., the duty cycle of the LED string 102), the current sink 118 may set the perceived brightness of the display 18 to various dimming levels.

As mentioned above, the operation of the backlight power and control circuitry 104 may be influenced by values stored in the calibration memory 120, which may represent any suitable memory to store operational parameters of the backlight power and control circuitry. For example, the calibration memory 120 may represent electrically erasable programmable read only memory (EEPROM), flash memory, read only memory (ROM), random access memory (RAM) programmed by a component of the electronic device 10, or any other suitable form of memory. By way of example, operational parameters of the backlight assembly 68 that may be stored in the calibration memory 120 may include a selectable inrush period Tinrush (e.g., 5 ms, 50 ms, 100 ms, and/or 500 ms, or the like) and/or settings associated with the inaudible enhanced PWM dimming 20 (e.g., number of individual duty cycles per extended duty cycle, preference for skip pulse location in extended duty cycle, and so forth).

To control the brightness of the display 18, the backlight assembly 68 may employ a pulse width modulation (PWM) backlight element 100 driving scheme. In particular, the LED string 102 current Istring drawn over the LED string 102 by the current sink 118 may be programmed for a maximum brightness, but "chopped" over a range of duty cycles to achieve a corresponding range of brightness levels. When the current sink 118 causes the activation signal VP to go high, the power line FET PLF3 may be turned on, the current Istring may be permitted to flow across the LED string 102, and the LED string 102 may emit light at maximum brightness. When the current sink 118 causes the activation signal VP to go low, the power line FET PLF3 may no longer permit current through the LED string 102, and the LED string 102 may go dark. The proportion of time during which the LED string 102 is turned on over a total pulse width modulation (PWM) clock cycle is referred to as an individual duty cycle (D) of the PWM signal. The PWM dimming ratio is inversely proportional to the duty cycle (D) of the PWM cycle, as generally described by the following relationship:

$$PWM \text{ dimming ratio} = \frac{1}{D};$$

$$\text{Or } PWM \text{ dimming ratio} = \frac{Tpwm}{TpwmON}.$$

The values Tpwm represents the period of the PWM is signal and TpwmON represents the period of the PWM pulse width or the period of "on" time. The maximum PWM dimming ratio can be calculated based on the maximum PWM period and the minimum PWM pulse width as follows:

$$PWM \text{ maximum dimming ratio} = \frac{Tpwm(\max)}{TpwON(\min)}.$$

A larger range of brightness values provides better brightness resolution. To increase this range of brightness values that can be generated by the backlight assembly 68, the maximum PWM dimming ratio may be relatively higher rather than lower. By decreasing the dimming PWM clock cycle frequency, the maximum PWM dimming ratio may be increased. Indeed, it may be appreciated that the human eye cannot detect the effect of the LED string 102 being rapidly turned on and off above frequencies approximately greater than 200 Hz. Instead, the human eye may interrupt the light from the LED string 102 cycled on and off at greater then 200 Hz as a constant emission of light at a particular intensity.

Even though the human eye may not detect any undesirable effects when the PWM clock frequency and, by extension, the PWM dimming ratio, are above 200 Hz, acoustic artifacts may occur unless the PWM clock frequency and/or PWM dimming ratio is greater than about 20 kHz. As such, a dimming PWM clock frequency greater than 20 kHz may be desired. With a higher PWM clock frequency, a higher PWM maximum dimming ratio may be more challenging to achieve.

For example, the backlight assembly 68 of the display 18 may be designed according to the following constraints:

PWM Dimming Clock Frequency (Fpwm)=33 kHz (max);
Maximum PWM Dimming Ratio (DR)=1000:1 (target);
Maximum LED Current (I_LED max)=350 mA.

The minimum PWM dimming duty cycle may be calculated as follows:

$$DR = \frac{1}{(TpwmON(\min) \times Fpwm)};$$
$$TpwmON(\min) = \frac{1}{(DR \times Fpwm)};$$
$$= \frac{1}{(1000 \times 33000)};$$
$$TpwmON(\min) = 30.30 \text{ nS}.$$

From this we can calculated the minimum duty cycle as follows:

$$D(\min) = \frac{30.30 \text{ nS} \times 33 \text{ kHz}}{\sim 0.001}$$
$$\text{Or } D(\min)\% = \frac{0.001 \times 100/1}{\sim 0.1\%}.$$

The Average LED current through an LED of the LED string 102 can be calculated as follows:

$I\_LED(\text{avg}) = 350 \text{ mA} \times D,$ where D is the duty cycle of an individual PWM dimming duty cycle.

From the above, the minimum system frequency (Fsys) that can generate a minimum duty cycle D of approximately ~30 ns may be calculated as follows:

$$Fsys = \frac{1}{TpwmON(\min)}$$
$$= \frac{1}{30.30 \text{ ns}}$$
$$Fsys = \sim 33 \text{ MHz}$$

Therefore the required PWM resolution (N) for 1000:1 dimming ratio can be calculated as follows:

$$PWM \text{ Resolution } (N) = \log_2(Fsys/Fpwm)$$
$$= \log_2(33 \text{ MHz}/33 \text{ KHz})$$
$$PWM \text{ Resolution } (N) = 10 \text{ bit}$$

Thus, one manner of achieving a PWM resolution greater than 10 bits may involve a higher system clock frequency. However, a higher system clock frequency may introduce higher costs, additional design time, additional development processes, and so forth. The present disclosure therefore teaches a manner of improved PWM dimming resolution (e.g., in addition to the 10-bit PWM resolution described above) without a higher system clock frequency. Namely, additional PWM dimming resolution may be achieved while remaining within system limitations or boundaries (e.g., without increasing the system clock frequency) using an extended duty cycle that spans multiple individual PWM duty cycles and PWM dimming clock cycles.

For example, if the minimum achievable PWM duty cycle is ~0.001 (~0.35 mA), the next step will be ~0.002 (0.7 mA) using only one PWM duty cycle that repeats indefinitely. However, with a two-PWM-cycle scheme, an intermediate value between D=0.001 and D=0.002 duty cycles can be achieved as follows:

Brightness Value #1 (intermediate value between D=0 and D=0.001):

$$I\_LED(avg)1 = 350 \text{ mA} \times D/2;$$
$$= 350 \text{ mA} \times 0.001/2;$$
$$I\_LED(avg)1 = \sim 0.17 \text{ mA}.$$

Brightness Value #2 (value D=0.001):

$$I\_LED(avg)2 = 350 \text{ mA} \times D;$$
$$= 350 \text{ mA} \times 0.001;$$
$$I\_LED(avg)2 = \sim 0.35 \text{ mA}.$$

Brightness Value #3 (intermediate value between D=0.001 and D=0.002):

$$I\_LED(avg)3 = 350 \text{ mA} \times 3 \times D/2;$$
$$= 350 \text{ mA} \times 3 \times 0.001/2;$$
$$I\_LED(avg)3 = \sim 0.52 \text{ mA}.$$

Brightness Value #4 (value D=0.002):

$$I\_LED(avg)4 = 350 \text{ mA} \times 0.002;$$

$$= \sim 0.7 \text{ mA};$$

Similarly, the intermediate value between any two brightness values can be calculated. It is clear from the above examples that using two PWM dimming cycles can achieve one intermediate, averaged current value between two adjacent duty cycles. Doing this improves the dimming PWM resolution from 10-bit to 11-bit. That is, an additional 1-bit dimming resolution can be gained by using two PWM clock cycles rather than only one, improving the dimming ratio (DR) by a factor of two (DR=2000).

Therefore, the intermediate average LED current value with an extended PWM duty cycle that employs two individual PWM duty cycles can be formulated as follows:

$$I\_LED(avg)\_2Cycles\_sch1 = I\_LED(max) \times \frac{\{(D_n + D_{n+1})\}}{2},$$

where n represents the number of brightness values from 0 to 1023 and $D_n$ and $D_{n+1}$ represent adjacent brightness values.

Similarly, other enhanced PWM dimming schemes involving extended PWM duty cycles using any suitable number of individual PWM duty cycles over a corresponding number of individual PWM clock cycles (e.g., 3, 4, 5, 6 . . . n PWM clock cycles) can be determined. Therefore, the following equation may relate the enhanced PWM resolution to the number of individual PWM duty cycles that form the extended PWM duty cycle:

Enhanced PWM Resolution=Base PWM Resolution+
$\log_2$(No. of individual PWM cycles)      (1), where the base PWM resolution is the resolution that would be achieved using only a single individual PWM duty cycle.

Figure 8:
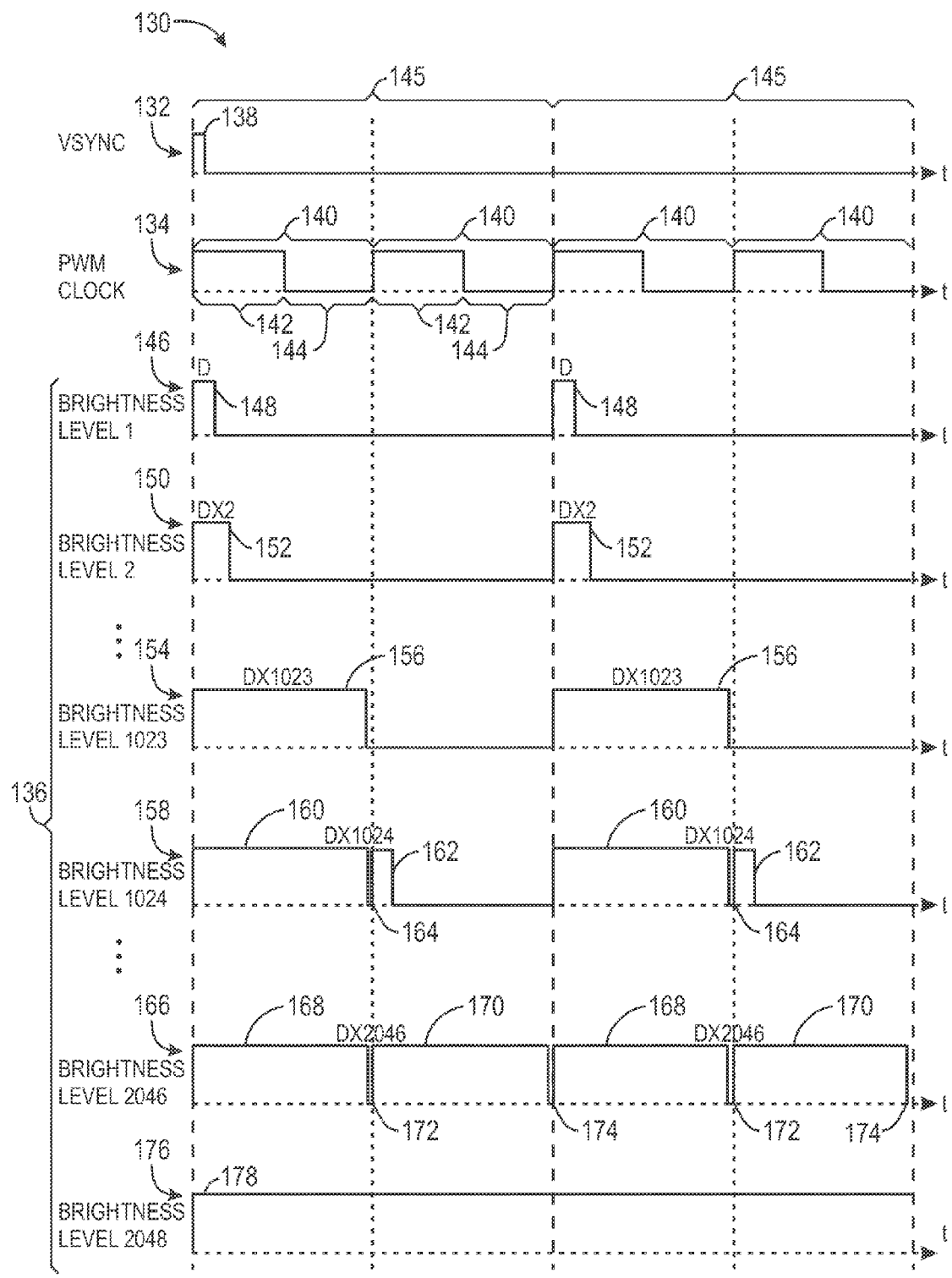
FIG. 8 is a timing diagram representing a manner of performing inaudible enhanced PWM dimming, in accordance with an embodiment.

One example of the manner in which inaudible enhanced PWM dimming 20 may be carried out appears in a timing diagram 130 of FIG. 8. It should be understood that the timing diagram 130 of FIG. 8 merely represents one particular example of carrying out the inaudible enhanced PWM dimming 20 and that any other suitable implementations may be employed. Also, the HSM and/or μC 110 may carry out the inaudible enhanced PWM dimming 20 in the manner of FIG. 8 using instructions stored in memory (e.g., the configuration memory 120). In the timing diagram 130, a variety of signals are shown against time t. A VSYNC signal 132 may be received by the backlight power and control circuitry 104, an initial pulse 138 of which may represent the start of a frame of video data displayed on the display 18. Other signals may be gated to the pulse 138 of the VSYNC signal 132, which may prevent certain image artifacts such as shimmering and glistening. These other signals illustrated in the timing diagram 130 include a PWM clock signal 134 and extended duty cycle signals 136, of which only one will be employed by the HSM and/or μC 110 at any time.

As will be described further below, the extended duty cycle signals 136 may be based on the PWM clock signal 134 and divided according to a higher-frequency clock signal (e.g., a system clock signal) at a frequency capable of further "chopping," or subdividing, the PWM clock signal 134 into suitable PWM duty cycle divisions or pulse widths. This higher-frequency clock signal is not shown because its frequency, in this example, is at least 512 times that of the PWM clock signal 134. The PWM clock signal 134 may take the form illustrated in FIG. 8, with repeating PWM clock cycles 140 composed of high and low periods 142 and 144 respectively of equal time. In other cases, the high periods 142 and the low periods 144 may be of different values (e.g., the beginning of each PWM clock cycle 140 may alternatively begin with a short pulse of the high period 142 and the remainder of the PWM clock cycle 140 may be the low period 144). The PWM clock signal 134 may be derived from a system clock signal (not shown) and each PWM clock cycle 140 may generally have a period associated with a frequency higher than 20 kHz (e.g., a period of less than 50 μs). However, the sum of two PWM clock cycles 140 may extend over a period of time of greater than 50 μs.

Each of the possible extended PWM duty cycle signals 136 may include extended duty cycles formed from multiple individual duty cycles. In the example of FIG. 8, each of the extended PWM duty cycle signals 136 includes extended duty cycles 145 that take place over two PWM clock cycles 140. Moreover, individual duty cycles associated with each of the PWM clock cycles 140 may be capable of 1024 distinct "chopped" LED string 102 "on" or "off" time values (i.e., each individual duty cycle may have a base resolution of 10 bits). Thus, according to Equation 1 above, the dimming resolution afforded by the enhanced PWM dimming of FIG. 8, incorporating two individual duty cycles for every extended duty cycle 145, may be approximately 11 bits.

In general, the extended duty cycles 145 of each of the possible extended duty cycle signals 136 may add additional "on" time sequentially across multiple individual duty cycles. However, as seen in FIG. 8, skip pulses are used to separate individual duty cycles of the extended duty cycles 145. In the extended duty cycle signal 146, which represents a first brightness level, an "on" period 148 includes only one PWM division of the first individual duty cycle of each extended duty cycle 145. In the extended duty cycle signal 150, which represents a second brightness level, an "on period" 152 includes only two PWM divisions of the first individual duty cycle of each extended duty cycle 145. Extended duty cycle signals 136 of higher brightness levels may continue this trend until reaching a brightness level involving two individual duty cycles. For example, an extended duty cycle signal 154 for a brightness level 1023 may include an "on" period 156 that is on for 1023 PWM divisions of the first individual duty cycle of each extended duty cycle 145. In the example of FIG. 8, since the extended duty cycles 145 of the extended duty cycle signals 146, 150, and 154 remain "on" no longer than one PWM clock cycle 140 (which is inaudible), the extended duty cycle signals 146, 150, and 154 may also remain inaudible without using a skip pulse.

At higher brightness levels, however, a skip pulse may be added between "on" periods of individual duty cycles of the extended duty cycles 145 to prevent audible noise. Specifically, an extended duty cycle signal 158 for a brightness level 1024 may have a first "on" period 160 that is on for 1023 PWM divisions of a first individual duty cycle and a second "on" period 162 of one PWM division of a second individual duty cycle. A skip pulse 164 separates the "on" periods 160 and 162 to prevent audible noise. For an extended duty cycle signal 166 for a brightness level 2046, a first "on" period 168 may be on for 1023 PWM divisions of a first individual duty cycle and a second "on" period 170 may be on for 1023 PWM divisions of a second individual duty cycle. A first skip pulse 172 may separate the first "on" period 168 and the second "on" period 170. A second skip pulse 174 may separate the second "on" period 170 and the first "on" period 168.

It may be appreciated that no brightness level 2047 in this example may be possible without potentially producing audible sounds. Thus, the brightness level 2046 may represent the maximum brightness level or, as shown in FIG. 8, a maximum brightness may be a DC extended duty cycle signal 176 with a single "on" period 178 that extends across all individual duty cycles. In the case of the extended duty cycle signal 176, the frequency of the "on" period 178 may be so low as to approach 0 Hz and thus be essentially inaudible. When the maximum brightness level is the brightness level 2048, the brightness level 2047 simply may be skipped and never used.

In the example discussed above with reference to FIG. 8, skip pulses are shown to separate "on" periods of adjacent individual PWM duty cycles. Although the example of FIG. 8 involves placing a skip pulse at the end of each individual duty cycle—that is, each individual duty cycle is only "on" for a maximum of all but the last PWM division (except for a maximum brightness level in which all individual duty cycles are fully on)—skip pulses may be placed in alternative locations in alternative embodiments. Specifically, as long as skip pulses prevent "on" periods from being continually "on" long enough to be audible, the skip pulses may have any suitable placement. Indeed, in other embodiments, the skip pulses may be, for example, the first PWM division of each individual duty cycle. Moreover, although the skip pulses are described in FIG. 8 as spanning a single PWM division, skip pulses may span any suitable number of divisions. For example, the skip pulses may alternatively span two or more PWM divisions or pulse widths.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic display backlight system comprising:
a backlight element; and
backlight driver circuitry configured to cause the backlight element to be driven at various brightness levels by varying a first individual duty cycle of the backlight element over a first pulse width modulation clock cycle and a second individual duty cycle of the backlight element over a second pulse width modulation clock cycle, wherein the first pulse width modulation clock cycle and the second pulse width modulation clock cycle occur immediately after one another, and wherein the backlight driver circuitry is configured to vary the first individual duty cycle and the second individual duty cycle such that neither the first individual duty cycle nor the second individual duty cycle will ever reach 100% unless both are 100%.

2. The backlight system of claim 1, wherein the backlight driver circuitry is configured to vary the first individual duty cycle and the second individual duty cycle such that an extended duty cycle encompassing both the first individual duty cycle and the second individual duty cycle will not have a single "on" period longer than either the first individual duty cycle or the second individual duty cycle unless the "on" period of the extended duty cycle has a duration of 100% of both the first pulse width modulation clock cycle and the second pulse width modulation clock cycle.

3. The backlight system of claim 1, wherein the backlight driver circuitry comprises a hardware state machine or a processor, or both, configured to vary the first duty cycle and the second duty cycle.

4. The backlight system of claim 1, wherein the first pulse width modulation clock cycle and the second pulse width modulation clock cycle have respective periods associated with frequencies higher than 20 kHz.

5. The backlight system of claim 4, wherein a total period encompassing both the first pulse width modulation clock cycle and the second pulse width modulation clock cycle repeats at a frequency less than 20 kHz.

6. A method of driving a backlight element of an electronic display comprising:
driving the backlight element over a first individual pulse width modulation duty cycle of 100% except for one or more first skip pulses, wherein the first individual pulse width modulation duty cycle occurs over a first pulse width modulation clock cycle having a period of between 25 μs and 50 μs; and
immediately after driving the backlight element over the first individual pulse width modulation duty cycle, driving the backlight element over a second individual pulse width modulation duty cycle of between a first value greater than 0% and a second value of 100% except for one or more second skip pulses, wherein the second individual pulse width modulation duty cycle occurs over a second pulse width modulation clock cycle having the period of between 25 μs and 50 μs;
wherein the one or more first skip pulses or the one or more second skip pulses, or both, prevent the backlight element from being driven continuously over the first individual pulse width modulation duty cycle and the second individual pulse width modulation duty cycle for a period of time associated with a frequency audible to humans.

7. The method of claim 6, wherein driving the backlight element over the first individual pulse width modulation duty cycle of 100% except for the one or more first skip pulses comprises driving the backlight element over first individual pulse width modulation duty cycle, wherein the first individual pulse width modulation duty cycle comprises an "on" period of at least one less than a maximum number of first pulse width modulation clock cycle divisions.

8. The method of claim 6, wherein driving the backlight element over the first individual pulse width modulation duty cycle of 100% except for the one or more first skip pulses comprises driving the backlight element over first individual pulse width modulation duty cycle, wherein the first individual pulse width modulation duty cycle comprises an "on" period of at least one less than 2, 4, 8, 16, 32, 64, 128, 256, 512, 1024, 2048, 4096, 8192, or 16384 total first pulse width modulation clock cycle divisions.

9. An article of manufacture comprising:
one or more tangible, machine-readable media comprising instructions executable by a processor that controls a backlight assembly, the instructions comprising:
instructions to receive a system clock signal;
instructions to determine a pulse width modulation clock cycle signal based at least in part on the system clock signal, wherein the pulse width modulation clock cycle signal comprises pulse width modulation clock cycles of less than about 50 μs;
instructions to receive a brightness level control signal from a host, wherein the brightness level control signal indicates a brightness level at a dimming resolution finer than a base dimming resolution, wherein the base dimming resolution is a dimming resolution achievable using a single pulse width modulation clock cycle of the pulse width modulation clock cycle signal;

instructions to determine an extended pulse width modulation duty cycle signal associated with the brightness level at least in part by:
  determining a first individual pulse width modulation duty cycle at least in part by dividing a first pulse width modulation clock cycle of the pulse width modulation clock cycle signal into divisions associated with the system clock signal that are either high or low; and
  determining a second individual pulse width modulation duty cycle to at least in part by dividing a second pulse width modulation clock cycle of the pulse width modulation clock cycle signal into divisions associated with the system clock signal that are either high or low;
  wherein the first individual pulse width modulation duty cycle and the second individual pulse width modulation duty cycle immediately follow one another in the extended pulse width modulation duty cycle, and wherein not all of the divisions of the first individual pulse width modulation duty cycle or the second individual pulse width modulation duty cycle are ever high such that the extended pulse width modulation duty cycle does not include any continuous high period greater than 50 μs; and
instructions to cause a current to pass through a backlight element according to the extended pulse width modulation duty cycle.

* * * * *